US010795571B2

(12) United States Patent
Ierullo et al.

(10) Patent No.: US 10,795,571 B2
(45) Date of Patent: Oct. 6, 2020

(54) SYSTEM AND METHOD TO PERFORM AN UNDO OPERATION USING A CONTINUOUS GESTURE

(71) Applicant: THE TORONTO-DOMINION BANK, Toronto (CA)

(72) Inventors: Mark Ierullo, Toronto (CA); Sophia Dhrolia, Toronto (CA); Andrew Ostos, Mississauga (CA); Arun Victor Jagga, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 67 days.

(21) Appl. No.: 15/718,677

(22) Filed: Sep. 28, 2017

(65) Prior Publication Data

US 2019/0095091 A1    Mar. 28, 2019

(51) Int. Cl.
*G06F 17/00* (2019.01)
*G06F 3/0488* (2013.01)
*G06F 3/0486* (2013.01)
*G06T 11/00* (2006.01)
*G06T 11/60* (2006.01)

(52) U.S. Cl.
CPC ........ *G06F 3/04883* (2013.01); *G06F 3/0486* (2013.01); *G06T 11/001* (2013.01); *G06T 11/60* (2013.01); *G06T 2200/24* (2013.01)

(58) Field of Classification Search
CPC ........................... G06F 3/04883; G06F 3/0486
USPC .................................................. 715/273, 772
See application file for complete search history.

(56) References Cited

U.S. PATENT DOCUMENTS

| 4,375,102 | A | * | 2/1983 | Van Daal | H04J 3/12 375/340 |
|---|---|---|---|---|---|
| 6,501,835 | B2 | | 12/2002 | Miller | |
| 6,910,016 | B1 | * | 6/2005 | Heler | G06Q 10/0633 705/7.27 |
| 7,149,699 | B2 | * | 12/2006 | Barnard | G06Q 10/06 705/7.26 |
| 7,206,828 | B1 | * | 4/2007 | Bourke-Dunphy | G06F 9/44505 709/221 |

(Continued)

OTHER PUBLICATIONS

Hobday, The project-based Organization: An Ideal Form for Managing Complex Products and Systems?, Elsevier 2000, pp. 781-893. (Year: 2000).*

(Continued)

*Primary Examiner* — Cong-Lac Huynh

(57) ABSTRACT

A computing device configured to communicate with a display provides a graphical user interface (GUI) and receives gestural input interacting with the GUI from input device. The computing device produces a region on the display to undo a previously performed action. Upon receiving input at the region via the input device, a counter is initiated to count an amount of time the input is consecutively received at the region. Upon the counter reaching a predetermined threshold, an action is executed to undo the previously performed action. A progress of the counter may be indicated. The progress may be indicated by altering the display at the region or a different region. The GUI at the region may display an empty progress bar before the input and be filled in response to the progress. A message may be communicated to invoke an undo operation by another device.

20 Claims, 4 Drawing Sheets

(56) References Cited

U.S. PATENT DOCUMENTS

| | | | |
|---|---|---|---|
| 2006/0087402 A1* | 4/2006 | Manning | G05B 19/41875 340/3.1 |
| 2006/0190825 A1* | 8/2006 | Zaag | H04M 1/72566 715/745 |
| 2007/0226228 A1* | 9/2007 | Her | H04L 29/06 |
| 2008/0240051 A1* | 10/2008 | Nagy | H04W 24/00 370/338 |
| 2008/0270929 A1* | 10/2008 | Bohn | H04L 67/34 715/772 |
| 2009/0254850 A1* | 10/2009 | Almeida | G06F 8/65 715/772 |
| 2010/0114641 A1* | 5/2010 | Coffman | G06Q 10/06 705/7.26 |
| 2010/0257526 A1* | 10/2010 | Zimmet | G06F 9/485 718/100 |
| 2011/0029445 A1* | 2/2011 | Whittacre | G06Q 10/06 705/317 |
| 2012/0066633 A1* | 3/2012 | Saito | G06F 13/00 715/772 |
| 2012/0154294 A1* | 6/2012 | Hinckley | G06F 1/169 345/173 |
| 2012/0172091 A1* | 7/2012 | Kurane | G06F 3/0482 455/566 |
| 2012/0259647 A1* | 10/2012 | Syed | G06Q 10/06 705/2 |
| 2013/0085778 A1* | 4/2013 | Guertin | G16H 80/00 705/3 |
| 2013/0227412 A1* | 8/2013 | Ornstein | G06F 3/04847 715/711 |
| 2013/0239039 A1* | 9/2013 | Kaleta | G06F 3/0484 715/772 |
| 2013/0333703 A1 | 12/2013 | Wallace et al. | |
| 2014/0223382 A1* | 8/2014 | Hicks | G06F 3/04883 715/863 |
| 2014/0258901 A1 | 9/2014 | Cho | |
| 2014/0304005 A1* | 10/2014 | Hughes | G06F 3/041 705/3 |
| 2015/0066780 A1* | 3/2015 | Cohen | G06Q 10/101 705/300 |
| 2015/0213410 A1 | 7/2015 | Swanson et al. | |
| 2015/0332139 A1 | 11/2015 | Pesola et al. | |
| 2015/0363207 A1* | 12/2015 | Mahajan | G06F 1/263 713/100 |
| 2016/0162478 A1* | 6/2016 | Blassin | G06Q 10/063112 706/12 |
| 2016/0239848 A1* | 8/2016 | Chang | G06Q 30/016 |
| 2017/0063767 A1* | 3/2017 | Lukas | H04L 51/22 |
| 2017/0228107 A1* | 8/2017 | Bhati | G06F 3/0482 |
| 2017/0336960 A1* | 11/2017 | Chaudhri | G06F 3/04817 |
| 2017/0337779 A1* | 11/2017 | Takasaki | A63F 13/80 |
| 2018/0113585 A1* | 4/2018 | Shah | G06F 3/0482 |
| 2018/0129997 A1* | 5/2018 | Floyd | G06Q 10/06313 |
| 2018/0165718 A1* | 6/2018 | Huynh | G06Q 30/0277 |
| 2018/0219823 A1* | 8/2018 | Mohan | H04L 51/22 |
| 2019/0108603 A1* | 4/2019 | Waslander | G06Q 50/163 |
| 2019/0197150 A1* | 6/2019 | Braud | G06F 21/604 |

OTHER PUBLICATIONS

Jain et al., A Comparison of Mobile Agent and Client-Server Paradigms for Information Retrieval Tasks in Virtual Enterprises, IEEE 2000, pp. 1-5. (Year: 2000).*

* cited by examiner

SYSTEM AND METHOD TO PERFORM AN UNDO OPERATION USING A CONTINUOUS GESTURE

FIELD

The present disclosure relates to gesture-based computer interfaces and more particularly to a system and method to perform an undo operation using a continuous gesture.

BACKGROUND

Graphical user interfaces (GUIs) for functions and applications for computer and other devices enable users to receive information and provide input, for example, to invoke an action such as a function, feature or service. Graphical user interfaces can play a significant role in the user experience and satisfaction in dealing with the associated device. Complicated user interfaces may result in erroneous user input. Such input may waste computer or other resources through unnecessary action while performing or partially performing undesired functions, features or services or in correcting the input. As well, some GUIs are more resource intensive than others, using computer resources unnecessarily.

From time to time a user may invoke an action using a GUI which the user would like to undo or cancel after the action has been invoked. Such actions may including storing data to a data store, such as a database, providing an electronic signature, providing input to a blog, choosing to join a group, unsubscribing to an email list, etc. It is desired to provide a system and method to perform an undo operation using a continuous gesture.

SUMMARY

A computing device configured to communicate with a display provides a graphical user interface (GUI) and receives gestural input interacting with the GUI from input device. The computing device produces a region on the display to undo a previously performed action. Upon receiving input at the region via the input device, a counter is initiated to count an amount of time the input is consecutively received at the region. Upon the counter reaching a predetermined threshold, an action is executed to undo the previously performed action. A progress of the counter may be indicated. The progress may be indicated by altering the display at the region or a different region. The GUI at the region may display an empty progress bar before the input and be filled in response to the progress. A message may be communicated to invoke an undo operation by another device.

In one aspect there is provided a computing device comprising a processor configured to communicate with a display to provide a graphical user interface (GUI) where the computing device has an input device to receive gestural input interacting with the GUI and instructions, which when executed by the processor, configure the computing device. The computing device is configured to: produce a region on the display to undo a previously performed action; upon receiving via the input device input at the region, initiate a counter to count an amount of time the input is consecutively received at the region; and upon the counter reaching a predetermined threshold, execute an action to undo the previously performed action.

In one aspect there is provided a computer implemented method comprising: producing a region of a graphical user interface (GUI) on a display to undo a previously performed action; upon receiving, via an input device, input at the region, initiating a counter to count an amount of time the input is consecutively received at the region; and upon the counter reaching a predetermined threshold, executing an action to undo the previously performed action.

In one aspect there is provided a computer program product comprising a non-transient storage device storing instructions that when executed by at least one processor of a computing device, configure the computing device to: provide a graphical user interface (GUI) where the computing device has an input device to receive gestural input interacting with the GUI; produce a region on the display to undo a previously performed action; upon receiving via the input device input at the region, initiate a counter to count an amount of time the input is consecutively received at the region; and upon the counter reaching a predetermined threshold, execute an action to undo the previously performed action.

These and other aspects will be apparent to those of ordinary skill in the art.

DETAILED DESCRIPTION

Figure 1:
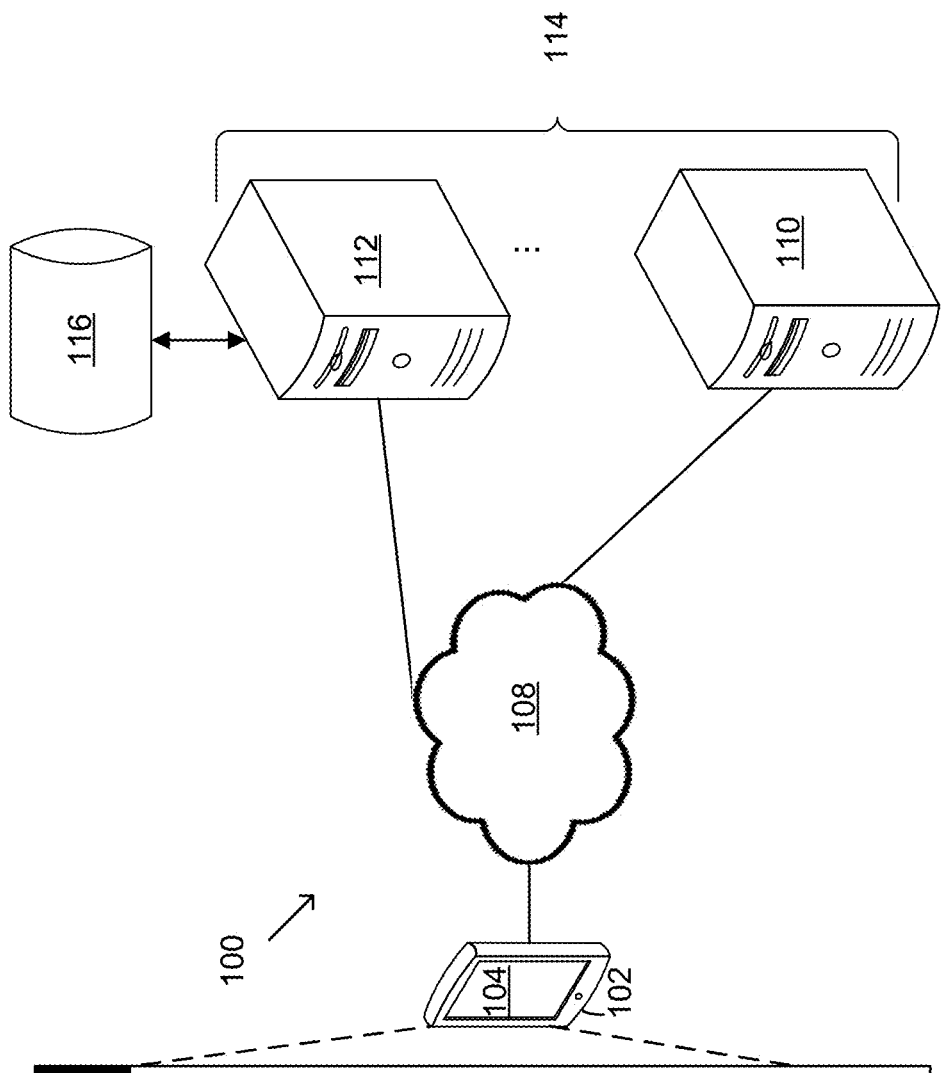
FIG. 1 is a diagram illustrating an example computing device communicating in a communication network and configured to output for display a graphical user interface via a gesture-based input/output (I/O) device, in accordance with one or more aspects of the present disclosure.
Figure 1:
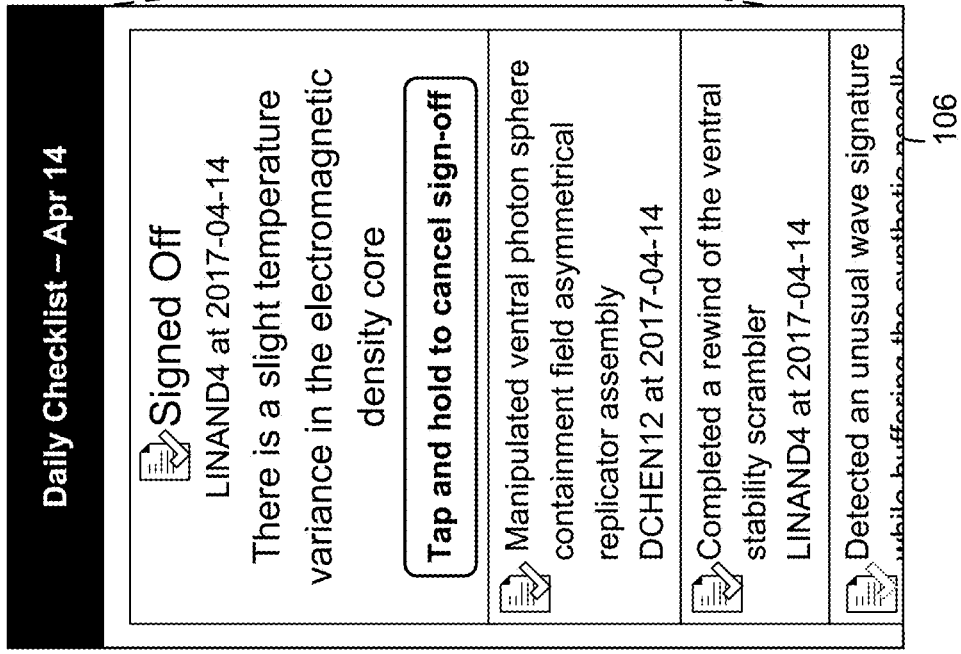

FIG. 1 is a diagram illustrating an example computer system 100 in which an example computing device 102 is configured to display, via a gesture-based I/O device 104, a graphical user interface (GUI) 106, in accordance with one or more aspects of the present disclosure. The computing device 102 communicates using one or more communication networks 108 with one or more other computing devices (e.g. 110 and 112 and collectively 114). Computing device 102, using GUI 106, may receive input to perform an action. In a present non-limiting example, the input defines a sign off with an optional comment, which sign off and optional comment are saved to a data store using a task management application. In this example, individuals such as employees may perform tasks or other duties and once completed, sign off on the tasks, and provide optional comments with each sign off using the task management application. The task management application may be implemented in a client-server paradigm where sign offs and comments are stored to a data store coupled to a server. Sign offs and comments may be shared with (e.g. communicated to and displayed by) employee client devices including device 102 among others (not shown). A GUI may be provided by the task management application to receive input to define the optional comments and invoke the sign off as described further herein. GUI 106 is also provided to undo a sign off and/or a comment as described further below. It will be understood that task management application and its associated actions are only provided as representative examples of a use of a computing device 102. This example is described herein to provide context for an undo operation using the teachings herein.

In the example of FIG. 1, computing device 102 is a mobile phone. Other examples of computing device 102 may be a tablet computer, a personal digital assistant (PDA), a laptop computer, a tabletop computer, a portable gaming device, a portable media player, an e-book reader, a watch, or another type of computing device. In the example of FIG. 1, other computing devices 114 are servers. While actions to store sign offs and optional comments to a common data store are typically performed by servers, other types of computing devices may be utilized such as mainframes, and other higher performance computing devices, etc.; however, actions may be performed on personal computers, workstations, laptops, etc. Each of these is an example of a computing device having at least one processing device and memory.

Computing device 102 is coupled for communication to a wide area network (WAN) 108 such as the Internet. Network 108 is coupled for communication with a plurality of computing devices (e.g. servers 110 and 112). It is understood that representative communication network 100 is simplified for illustrative purposes. Additional networks may also be coupled to network 108 such as a wireless network between WAN 108 and computing device 102 (not shown).

Although the present disclosure illustrates and discusses a gesture-based I/O device 104 primarily in the form of a screen device with 10 capabilities (e.g. touchscreen), other examples of gesture-based I/O devices may be utilized which may detect movement and which may not comprise a screen per se. Computing device 102 may receive gesture-based input from a track pad/touch pad, one or more cameras, or another presence or gesture sensitive input device, where presence means presence aspects of a user including for example motion of all or part of the user.

Computing device 102 may generate output for display on a screen of gesture-based I/O device 104 or in some examples, for display by a projector, monitor or other display device. It will be understood that gesture-based I/O device 104 may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

In the examples described herein, gesture-based I/O device 104 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 104. Gesture-based I/O device 104 and may also include non-tap gestures. Gesture-based I/O device 104 may output or display information, such as a graphical user interface (106), to a user. The gesture-based I/O device 104 may present various applications, functions and capabilities of the computing device 102 including, for example, messaging applications, telephone communications, contact and calendar applications, Web browsing applications, game applications, e-book applications and financial, payment and other transaction applications or functions among others.

Servers 114 may be configured to perform one or more types of actions as instructed by computing device 102 (for example in a message communicated from device 102). In one example, server 112 may be configured to store data to a data store 116, comprising a database, as a server-side component of a task management system. In one example, server 110 may be configured to communicate messages on behalf of device 102 to other devices (not shown) such as email, etc. Servers 114 may be configured to respond to actions instructed by device 102, for example providing data confirming receipt of a communicated action, confirming the processing of an action. Some actions may request data from a server (e.g. its data store or another server or device with which it is coupled for communication. The data may be displayed in a GUI on device 104

Figure 2:
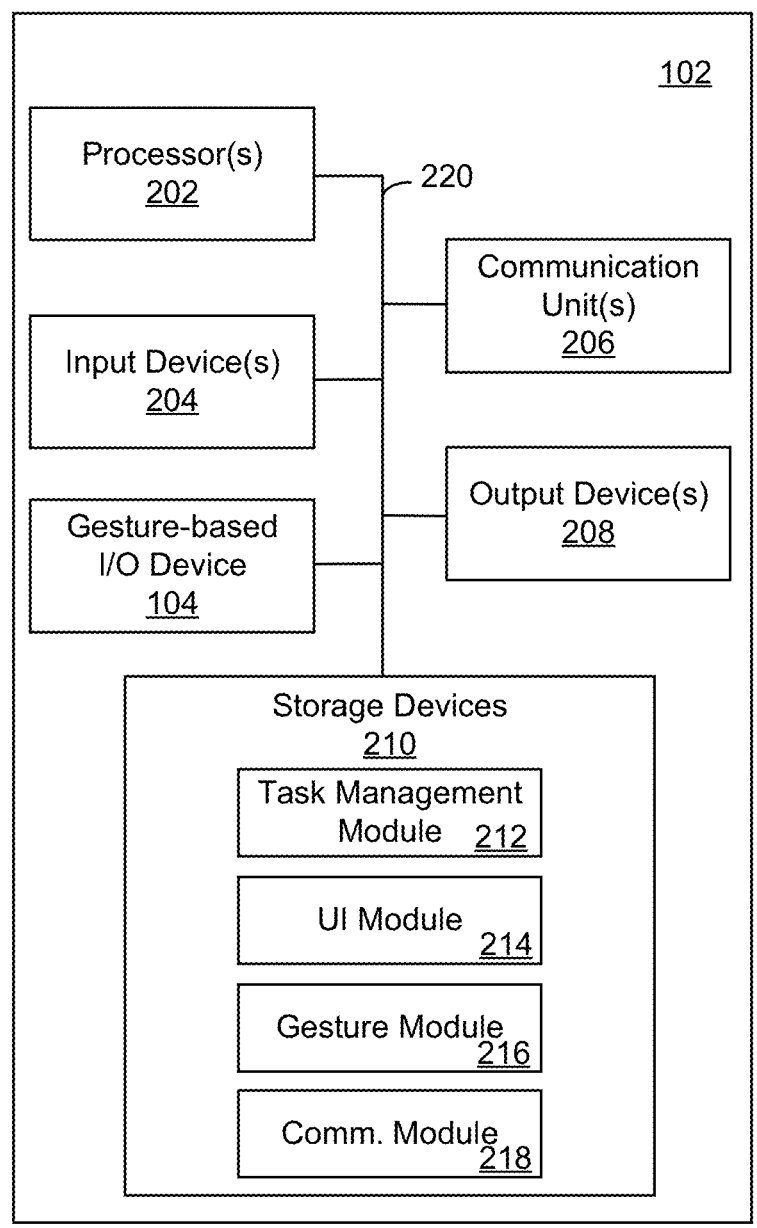
FIG. 2 is a diagram illustrating an example computing device, in accordance with one or more aspects of the present disclosure.

FIG. 2 is a diagram illustrating in block form an example computing device (e.g. 102), in accordance with one or more aspects of the present disclosure, for example, to provide a system and perform to perform an undo operation using a continuous gesture. As noted the undo operation may be in the context of a task management application but this example is not to be limiting. Computing device 102 comprises one or more processors 202, one or more input devices 204, gesture-based I/O device 104, one or more communication units 206 and one or more output devices 208. Computing device 102 also includes one or more storage devices 210 storing one or more modules such as task management module 212, UI module 214, gesture module 216 and communication module 218. Communication channels 220 may couple each of the components 104, 202, 204, 206, 208, 210, 212, 214, 216 and 218 for inter-component communications, whether communicatively, physically and/or operatively. In some examples, communication channels 220 may include a system bus, a network connection, an inter-process communication data structure, or any other method for communicating data.

One or more processors 202 may implement functionality and/or execute instructions within computing device 102. For example, processors 202 may be configured to receive instructions and/or data from storage devices 210 to execute the functionality of the modules shown in FIG. 2, among others (e.g. operating system, applications, etc.) Computing device 102 may store data/information to storage devices 210. Some of the functionality is described further herein below.

One or more communication units 206 may communicate with external devices such as servers 108 and 110, etc. via one or more networks (e.g. 104) by transmitting and/or receiving network signals on the one or more networks. The communication units may include various antennae and/or network interface cards, etc. for wireless and/or wired communications.

Input and output devices may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. 220).

The one or more storage devices 210 may store instructions and/or data for processing during operation of computing device 102. The one or more storage devices may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Task management module 212 may comprise an application (whether native or browser-based) and may be configured to obtain input to perform an action. An action herein is construed broadly as an operation of computing device 102 or an operation of one or more other computing devices (e.g. servers 114) to which computing device 102 is coupled or other devices to which device 102 is coupled which other device may not be a computing device per se (e.g. equipment). In one example, the operation is a storing of data such as a sign off and optionally a comment associated with the sign off. The storing may be performed by server 112. Task management module 212 may cooperate with UI module 214 and gesture module 216 to present a user interface and receive gesture input via gesture-based I/O device 104. Certain information to present in the user interface may be obtained from servers 114 (e.g. server 112) for example, looking up data stored on behalf of a user instructing the action or undo action as described.

Gesture module 216 may receive input from gesture-based I/O device 104 entered via the touchscreen, processing same for communication with task management module 212 and/or UI module 214 and/or others not shown. In some configurations, the gesture module 216 may be a component of an operating system. In response to input detected by gesture-based I/O device 104, gesture module 216 may receive information for processing. The information may be aggregated or grouped to generate one or more touch or gesture events. The events may include data representing a location on gesture-based I/O device 104 where the input is received, a time when the input or part thereof is received at the location, and/or a direction component (e.g. push down, pull up, lateral motion). The touch events may be communicated to the ask management module 212 and/or UI module 214 for further processing.

Task management module 212 and/or UI module 214 may use the data associated with the one or more touch events to determine a response. In one example, task management module 212 may, based on the location components of these touch events, instruct a sign off and may invoke UI module 214 to modify the GUI for output via gesture-based I/O device 104 to reflect the sign off. Task management module 212 may generate a signal comprising sign off information to instruct the performance of the sign off action and communicate (e.g. via communication module 218) the signal such as to server 112.

It will be understood that a swipe operation requires a continuous interaction with the interface elements of the device and the device can provide the user with interaction references to allow for easier targeting for the user. This is not the case for tap-based interfaces. These require the user to completely disconnect their interaction with the relevant module or component processing the tap interaction to retarget the next step (e.g. tap) in the interface. Such can lead to errors in inputting and thus errors in or otherwise wasted operations by the device or system with which the device is communicating as the device and/or system processes that erroneous input.

It is understood that operations may not fall exactly within the modules 212-218 of FIG. 2 such that one module may assist with the functionality of another.

FIGS. 3-6 are diagrams illustrating example graphical user interfaces, in accordance with one or more aspects of the present disclosure. These GUIs may be generated by computing device 102 for output by gesture-based I/O device 104. FIGS. 3-6 illustrate a GUI for instructing an undo operation in accordance with an embodiment.

Figure 3:
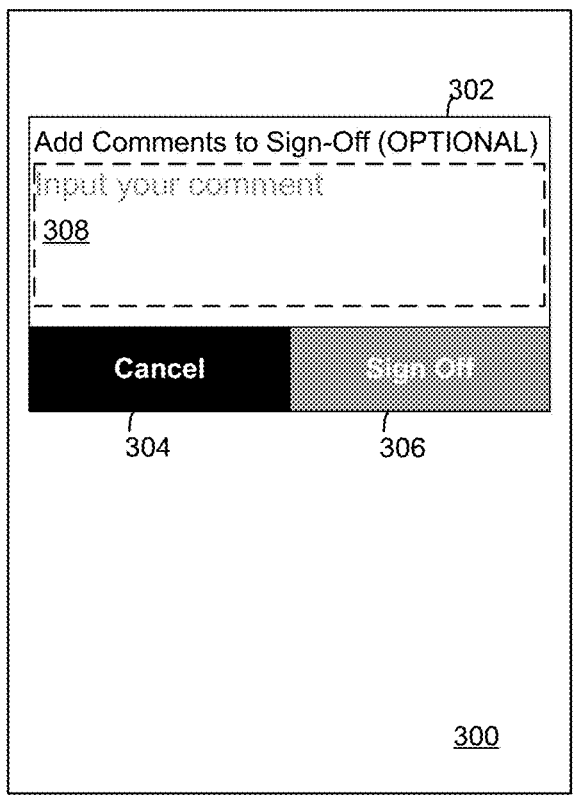
FIGS. 3-6 are diagrams illustrating example graphical user interfaces or portions thereof, in accordance with one or more aspects of the present disclosure.

FIG. 3 shows GUI 300 comprising a plurality of GUI elements in respective regions 302-306 of a display such as a screen of gesture-based I/O device 104. A region here is a portion of the screen having a respective location. The location is typically a two dimensional shape. Region 302 comprises a comment entry box. Region 304 represents a cancel button and region 306 a sign off button. Respective controls associated with the regions (e.g. software/instructions in UI module 214 and/or task manager module 212) receive gesture input (e.g. via gesture module 216) such as a tap or other interaction to invoke the control. Gesture module 216 and/or UI module 214 may determine the location of the gesture to determine which control is to be invoked. In some examples the effective location to invoke a respective control may be a sub-region, namely a portion of a region where GUI elements associated with the control are displayed. A region may have graphic elements which if interacted with do not actually invoke the control. Only if the sub region is interacted with the control is invoked. For example, a tap in a sub-region 308 within region 302 marked by a rectangle in broken lines (which need not be displayed in the GUI) may invoke the control to receive a comment. Invoking the control associated with this sub region 308 may invoke a keyboard GUI (not shown) to input the comments. In some examples, voice to text recognition may be used (e.g. after tapping the sub-region 308.

Figure 4:
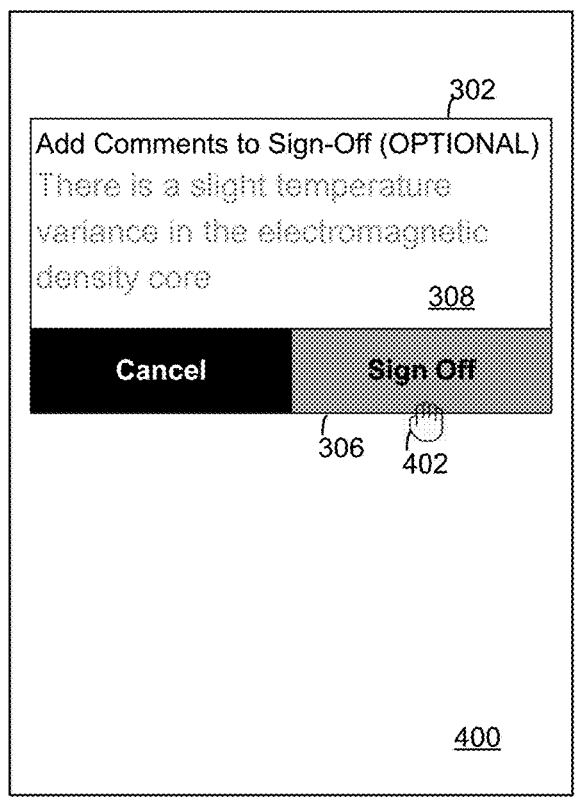

FIG. 4 shows GUI 400, after an optional comment has been input. The comment is displayed in sub region 308. FIG. 4 shows a representative illustration of a user hand 402 interacting with GUI element 306 within the respective region on the screen to invoke the associated control to perform a sign off. The gesture may be a tap or force click, etc. In the present example, GUI element in region 306 is updated in response to the gesture, such as by changing a color or shade of text of the words "sign off" or other means which are not shown (e.g. changing color of the background color of the GUI element, displaying another graphical element on top or near the GUI element or otherwise). Other means to confirm the receipt of an interaction include activating a bell or other sound, a vibration, a light, etc.).

Invoking the associated control for the sign off triggers task manager module 212 to communicate a message to server 112 to perform an associated action, namely store the sign off in the data store 116 with the comment, if any. The message may include the comment. This associated action may be undone with an undo control as described further. In other examples, which are not illustrated, the interaction with a control may invoke the computing device 102 to perform an action, which action may be undone with an undo control.

Figure 5:
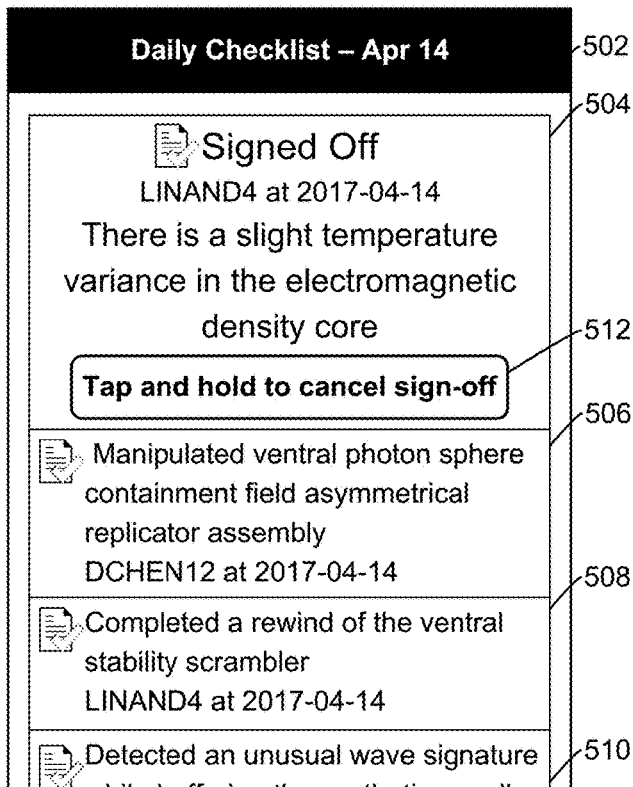

FIG. 5 shows a GUI 106 comprising a daily checklist display feature of task manager module 201. GUI 106 may be displayed following a completion of a sign off (e.g. following GUI 400). GUI 106 comprises regions 502-510.

Region 502 shows a title for the display. Region 504 shows the recent sign off activity of a particular user (e.g. employee). Regions 506-510 show older sign off activities for employees such as in a chronological order, newest to oldest, which may be scrolled via a swipe gesture or tap and drag gesture to view older activities (not shown). Region 504 comprises sub region 512 showing an undo button or bar. The graphical element may take other forms. Interacting with this sub-region invokes an associated control to undo the sign off. Interacting involves a tap and hold for a predetermined threshold amount of time (e.g. 3 seconds). In this way the desired action is confirmed by holding rather than by displaying a confirmation GUI which requests an input to confirm the desired action. The initial invocation of the control may start a counter to count (up or down) the predetermined threshold amount of time. It is preferred that the hold input may be received anywhere in the sub region to allow for a user to move without having to restart the tap and hold gesture.

Figure 6:
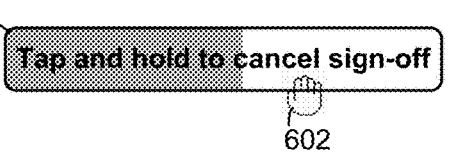

FIG. 6 shows sub-region 512 in isolation and including a representative interaction 602 (e.g. a hand representing a tap and hold input gesture. Sub-region 512 may be updated or otherwise altered to reflect the progress of the counter during the hold period (threshold amount of time). In the present example, the graphical element is shown as a progress bar which changes color or shade such as by filling the bar in response to the progress of the counter. Other alterations or confirmations of the hold gesture may be used. A count down timer may be displayed elsewhere (in another region). Sound may be presented, for example counting down the time. The sound may be in a spoken language or a series of tones (e.g. 3 beeps, two beeps, 1 beep).

FIGS. 1-6 show a computing device having a processor configured to communicate with a display to provide a GUI where the computing device has an input device to receive gestural input interacting with the GUI. The processor is configured with instructions, which when executed, produce a region on the display for undoing a previously performed action. Upon the processor receiving input at the region, a counter is initiated to count the amount of time the input is consecutively received at the region. Upon the counter reaching a predetermined threshold, the processor executes an action to undo the previously performed action.

The processor may be configured (e.g. via the instructions) to indicate a progress of the counter. Progress may be indicated by altering the display in the region or a different region. The region may be a visual display of an empty progress bar and the region may be altered by filling the bar.

The action which the processor may execute to undo the previously performed action may be communicating a message to another computing device.

Figure 7:
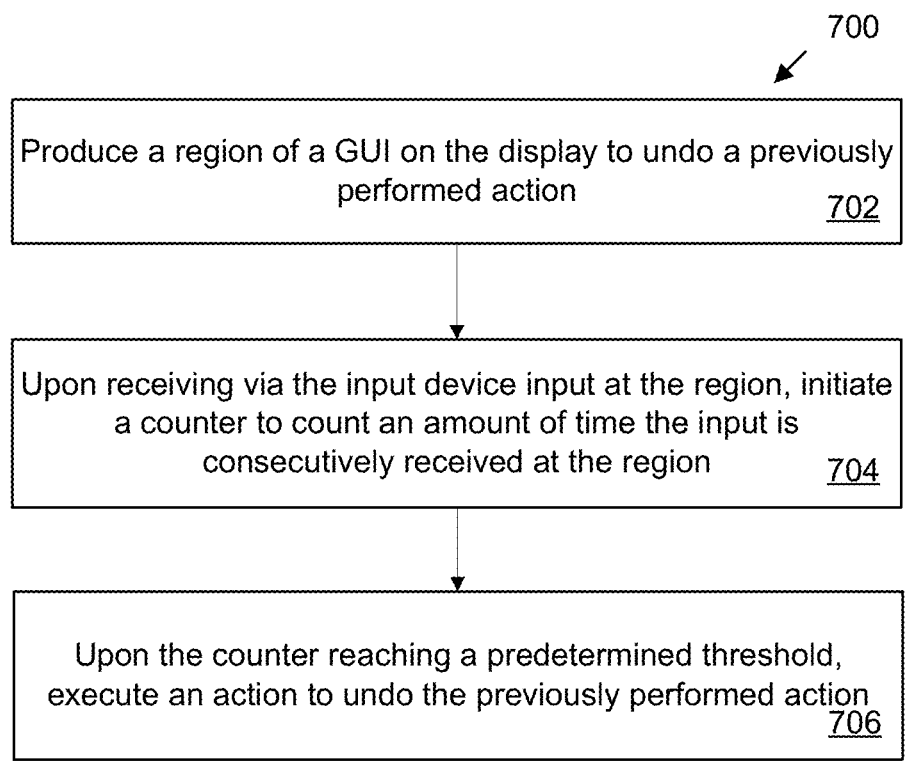
FIG. 7 is a flowchart illustrating an example operation of a computing device, in accordance with one or more examples of the present disclosure.

FIG. 7 is a flowchart of operations 700 which may be performed by a computing device such as device 102. The computing device may comprise a processor configured to communicate with a display to provide a graphical user interface (GUI) where the computing device has an input device to receive gestural input interacting with the GUI and wherein instructions, which when executed by the processor, configure the computing device to perform operations such as operations 700. Operations 700 relate to an undo action. At 702 the computing device operates to produce a region on the display to undo a previously performed action. At 704, upon receiving via the input device input at the region, operations of the computing device initiate a counter to count an amount of time the input is consecutively received at the region. And at 706, upon the counter reaching a predetermined threshold, the operations execute an action to undo the previously performed action.

The computing device may operate to indicate a progress of the counter. The progress may be indicated by altering the display at the region or a different region. In one example, the GUI at the region comprises an empty progress bar before the input and the GUI at the region is altered by filling the bar.

Operations may comprise communicating a message to another computing device to undo the previously performed action.

The region of the GUI may be associated with a control to initiate the counter and execute the action.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A computing device comprising a processor configured to communicate with a display to provide a graphical user interface (GUI) where the computing device has an input device to receive gestural input interacting with the GUI and a memory coupled to the processor; and wherein the memory stores instructions, which when executed by the processor, configure the computing device to:
   communicate with a remote computing device to have the remote computing device perform an action comprising storing data confirming the completion of a task where the task comprises a non-messaging task, the remote computing device providing a task management service for the computing device and a plurality of other computing devices to track task performance of tasks comprising non-messaging tasks;
   produce a region on the display to undo the action, the action defining a previously performed action;
   upon receiving via the input device input at the region, initiate a counter to count an amount of time the input is consecutively received at the region; and
   upon the counter reaching a predetermined threshold amount of time, execute an action to undo the previously performed action, wherein the action to undo comprises sending a message to the remote computing device to undo the action;
   wherein the instructions configure the computing device to provide the GUI as a component of a task management application for the computing device to track performance of tasks.

2. The computing device of claim 1 configured by the instructions to indicate a progress of the counter.

3. The computing device of claim 2 wherein to indicate the progress comprises altering the display at the region or a different region.

4. The computing device of claim 3:
   wherein the GUI at the region comprises an empty progress bar before the input; and
   wherein altering the GUI at the region comprises filling the bar.

5. The computing device of claim 1 wherein the region of the GUI is associated with a control to initiate the counter and execute the action.

6. The computing device of claim 1, wherein the previously performed action stores data comprising a sign off of a completed task.

7. The computing device of claim 6 wherein the sign off is associated with a comment and the previously performed action stores the sign off and comment to a data store remotely coupled to the computing device.

8. A computer implemented method comprising:
   communicating, by a first computing device, with a remote computing device to have the remote computing device perform an action comprising storing data confirming the completion of a task where the task comprises a non-messaging task, the remote computing device providing a task management service for the first computing device and a plurality of other computing devices to track task performance of tasks comprising non-messaging tasks;
   producing a region of a graphical user interface (GUI) on a display to undo the action, the action defining a previously performed action;
   upon receiving, via an input device, input at the region, initiating a counter to count an amount of time the input is consecutively received at the region; and
   upon the counter reaching a predetermined threshold amount of time, executing an action to undo the previously performed action, wherein the action to undo comprises sending a message to the remote computing device to undo the action;
   wherein the GUI is produced as a component of a task management application for the first computing device to track performance of tasks.

9. The method of claim 8 comprising indicating a progress of the counter.

10. The method of claim 9 wherein the indicating the progress comprises altering the display at the region or a different region.

11. The method of claim 10 wherein method comprises displaying an empty progress bar at the region before the input and wherein altering the display comprises filling the bar.

12. The method of claim 8 comprising associating the region of the GUI with a control to initiate the counter and execute the action.

13. The method of claim 8 wherein the method is performed by at least one processor of a computing device, the at least one processor coupled to a non-transient storage device storing instructions to configure the at least one processor, when executed, to perform the method.

14. The method of claim 8, wherein the previously performed action stores data comprising a sign off of a completed task.

15. A computer program product comprising a non-transient storage device storing instructions that when executed by at least one processor of a computing device, configure the computing device to:

communicate with a remote computing device to have the remote computing device perform an action comprising storing data confirming the completion of a task where the task comprises a non-messaging task, the remote computing device providing a task management service for the computing device and a plurality of other computing devices to track task performance of tasks comprising non-messaging tasks;

provide a graphical user interface (GUI) where the computing device has an input device to receive gestural input interacting with the GUI;

produce a region on the display to undo the action, the action defining a previously performed action;

upon receiving via the input device input at the region, initiate a counter to count an amount of time the input is consecutively received at the region; and upon the counter reaching a predetermined threshold amount of time, execute an action to undo the previously performed action, wherein the action to undo comprises sending a message to the remote computing device to undo the action;

wherein the GUI is produced as a component of a task management application for the computing device to track performance of tasks.

16. The computer program product of claim 15 wherein the instructions configure the computing device to indicate a progress of the counter.

17. The computer program product of claim 16 wherein the instructions configure the computing device to indicate the progress by altering the display at the region or a different region.

18. The computer program product of claim 17 wherein the instructions configure the computing device to display an empty progress bar at the region before the input and alter the region by filling the bar.

19. The computer program product of claim 15 wherein the instructions configure the computing device to associate the region of the GUI with a control to initiate the counter and execute the action.

20. The computer program product of claim 15, wherein the previously performed action stores data comprising a sign off of a completed task.

* * * * *